United States Patent
Miura

(10) Patent No.: US 7,576,462 B2
(45) Date of Patent: Aug. 18, 2009

(54) ELECTROMAGNETIC EXCITER

(75) Inventor: Naoki Miura, Fujiyoshida (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 72 days.

(21) Appl. No.: 11/441,740

(22) Filed: May 25, 2006

(65) Prior Publication Data

US 2006/0266967 A1 Nov. 30, 2006

(30) Foreign Application Priority Data

May 30, 2005 (JP) ............................. 2005-156486

(51) Int. Cl.
*H02K 37/14* (2006.01)
*H02K 5/173* (2006.01)
*H04R 9/02* (2006.01)
*H04R 1/00* (2006.01)
*H04R 7/04* (2006.01)

(52) U.S. Cl. ..................... 310/89; 310/91; 310/81; 310/12; 310/75 A; 310/14; 310/15; 251/129.15

(58) Field of Classification Search .................. 310/81, 310/12, 75 A, 89, 91, 14, 15; 318/128; 251/129.15; H02K 37/14, 5/173; H04R 9/02, 1/00, 7/04
See application file for complete search history.

(56) References Cited

U.S. PATENT DOCUMENTS 5,811,903 A * 9/1998 Ueno et al. ................... 310/90
5,894,263 A * 4/1999 Shimakawa et al. ....... 340/388.1
6,380,650 B1 * 4/2002 Kiuchi et al. ................. 310/89
6,590,991 B1 * 7/2003 Maeda ........................ 381/409
2003/0227225 A1 * 12/2003 Kaneda et al. ................ 310/81
2005/0285453 A1 * 12/2005 Oh et al. ....................... 310/14
2005/0285454 A1 * 12/2005 Choi et al. .................... 310/14

FOREIGN PATENT DOCUMENTS

EP 0 845 920 A2 6/1998
JP 2003-251278 9/2003
WO WO 02/09470 A2 1/2002

OTHER PUBLICATIONS

U.S. Appl. No. 11/404,429, filed Apr. 14, 2006.
British Patent Office Search Report, GB Pat. App. No. 0610216.4, Oct. 3, 2006.

* cited by examiner

*Primary Examiner*—Quyen Leung
*Assistant Examiner*—John K Kim
(74) *Attorney, Agent, or Firm*—Brinks Hofer Gilson & Lione

(57) ABSTRACT

An electromagnetic exciter includes a casing having a cylindrical side wall with first and second end openings. A suspension supports a magnetic circuit assembly vibratably in the cylindrical side wall. The suspension has a ring-shaped outer section integrally formed along the peripheral edge of the second end opening of the cylindrical side wall, an inner section provided at the radial center of the cylindrical side wall, and a connecting section that interconnects the inner and outer sections. The inner, outer and connecting sections are integrally molded with the casing.

11 Claims, 2 Drawing Sheets

ELECTROMAGNETIC EXCITER

This application claims priority under 35 U.S.C. §119 to Japanese Patent Application No. JP2005-156486 filed May 30, 2005, the entire content of which is hereby incorporated by reference.

BACKGROUND OF THE INVENTION

1. Field of the Invention

The present invention relates to electromagnetic exciters that may be incorporated into cellular phones or other devices to generate sound or vibration in response to an electric signal.

2. Description of the Background Art

Conventionally, mobile communications devices such as cellular phones and personal digital assistants (PDAs) are arranged to inform the user of an incoming call by selectively generating beep sound or melody sound, or vibrating the housing of the device instead of producing sound. For this purpose, these communications devices have a combination of a small speaker and a vibrator that generates vibration by rotating an eccentric weight with a small motor. Incorporating both a speaker and a vibrator into such a communications device, however, is disadvantageous from the viewpoint of achieving size and cost reduction of the device. Under these circumstances, use has recently been made of an electromagnetic exciter that can generate both sound and vibration by itself [see, Japanese Patent Application Publication No. 2003-251278].

FIGS. 3 and 4 each shows such a conventional electromagnetic exciter. The illustrated electromagnetic exciter has a synthetic resin casing 12 with a cylindrical side wall 12a. A diaphragm 13 for generating an acoustic output is secured to the upper peripheral edge of the casing 12. A voice coil 14 is attached to the diaphragm 13 and inserted into a magnetic gap g formed in a magnetic circuit assembly 18. The magnetic circuit assembly 18 includes a cylindrical cup-shaped outer yoke 16 formed from a high-permeability material and an axially magnetized cylindrical permanent magnet 15 provided in the outer yoke 16 and secured to the bottom wall of the outer yoke 16. The magnetic circuit assembly 18 further includes an inner yoke 17 formed from a high-permeability material and secured to the upper end of the permanent magnet 15. A top cover 20 is attached to the top of the casing 12. A back cover 21 is attached to the bottom of the casing 12.

The outer yoke 16 is connected to the casing 12 through a suspension 19. Thus, the outer yoke 16 is supported by the suspension 19 so as to be vibratable in its axial direction.

When the voice coil 14 is excited by a driving signal, the voice coil 14 and the magnetic circuit assembly 18 vibrate relative to each other by interaction between the voice coil 14 and the magnet 15. When the driving signal is of a relatively high frequency in an audio-frequency region, the voice coil 14 mainly vibrates, causing the housing of the electronic device to vibrate through the diaphragm 13. When the frequency of the driving signal is low, the magnetic circuit assembly 18 mainly vibrates, and this vibration causes the housing of the electronic device to vibrate through the suspension 19 and the casing 12.

The outer periphery of the outer yoke 16 is integrally formed with a ring-shaped additional weight 16a made of a high-density magnetic material, e.g. iron, or a tungsten alloy, to increase the weight of the magnetic circuit assembly 18, thereby lowering the natural frequency of the magnetic circuit assembly 18 and reducing the amplitude of the vibration of the magnetic circuit assembly 18, and thus enabling the whole electromagnetic exciter to be reduced in size (thickness) correspondingly.

In the electromagnetic exciter shown in FIG. 4, an additional weight 16b prepared as a discrete member from the outer yoke 16 is connected to the outer yoke 16.

The above-described conventional electromagnetic exciter suffers from the following problem.

The suspension 19 is secured with its radially outer end portion inserted into the cylindrical side wall 12a of the casing 12 by insert molding. Accordingly, the cylindrical side wall 12a needs to have an increased thickness in order to support the suspension 19. If an attempt is made to increase the thickness of the cylindrical side wall 12a while keeping the external shape thereof constant, the internal volumetric capacity for accommodating the magnetic circuit assembly 18 is reduced, and the extent to which the volume of the additional weight may be increased is limited correspondingly.

SUMMARY OF THE INVENTION

An object of the present invention is to provide an electromagnetic exciter free from the above-described disadvantage of the conventional art.

The present invention provides an electromagnetic exciter including a casing having a cylindrical side wall with first and second end openings. A diaphragm is provided in such a manner that it closes the first end opening of the cylindrical side wall. A magnetic circuit assembly is provided inside the cylindrical side wall. The magnetic circuit assembly has a permanent magnet and a magnetic gap through which magnetic flux of the permanent magnet passes. A voice coil is attached to the diaphragm and inserted into the magnetic gap. The electromagnetic exciter further includes a suspension that supports the magnetic circuit assembly inside the cylindrical side wall so that the magnetic circuit assembly is vibratable in the axial direction of the cylindrical side wall. The suspension is integrally molded with the cylindrical side wall so as to extend radially inward from the peripheral edge of the second end opening of the cylindrical side wall.

In the conventional electromagnetic exciter, the suspension is secured to the cylindrical side wall with its radially outer end portion inserted into the cylindrical side wall. Accordingly, the cylindrical side wall needs to have an increased thickness. In the electromagnetic exciter according to the present invention, the suspension is integrally formed with the casing as an extension of the cylindrical side wall of the casing. Therefore, the thickness of the cylindrical side wall need not be increased.

Specifically, the suspension may have an outer section integrally formed with the peripheral edge of the second end opening; an inner section that supports the magnetic circuit assembly at the radial center of the second end opening; and a connecting section that connects the inner section to the outer section and resiliently supports the inner section. The outer section, the connecting section and the inner section are integrally formed with the casing.

More specifically, the inner section of the suspension may be positioned closer to the first end opening than the outer section.

In addition, the outer section of the suspension may be a ring extending along the peripheral edge of the second end opening of the casing.

Further, the inner section of the suspension may be of a disk shape.

Further, the connecting section may be a pair of arcuate arms disposed in symmetry to each other with respect to the axis of the casing, each of the arms being connected at one end thereof to the outer section and at the other end thereof to the inner section.

In the electromagnetic exciter according to the present invention, the suspension that supports the magnetic circuit assembly inside the casing is integrally formed with the casing so as to extend radially inwardly from the peripheral edge of the second end opening of the cylindrical side wall of the casing. Therefore, the thickness of the cylindrical side wall of the casing need not be increased. Accordingly, it is possible to increase the inside space of the casing to accommodate an additional weight attached to the magnetic circuit assembly. Thus, it is possible to increase the size of the weight and hence possible to increase the mass of the magnetic circuit assembly.

The above and other objects, features and advantages of the present invention will become more apparent from the following description of the preferred embodiments thereof, taken in conjunction with the accompanying drawings.

DESCRIPTION OF THE PREFERRED EMBODIMENTS

The electromagnetic exciter according to the present invention will be described below in detail with reference to the accompanying drawings.

Figure 1:
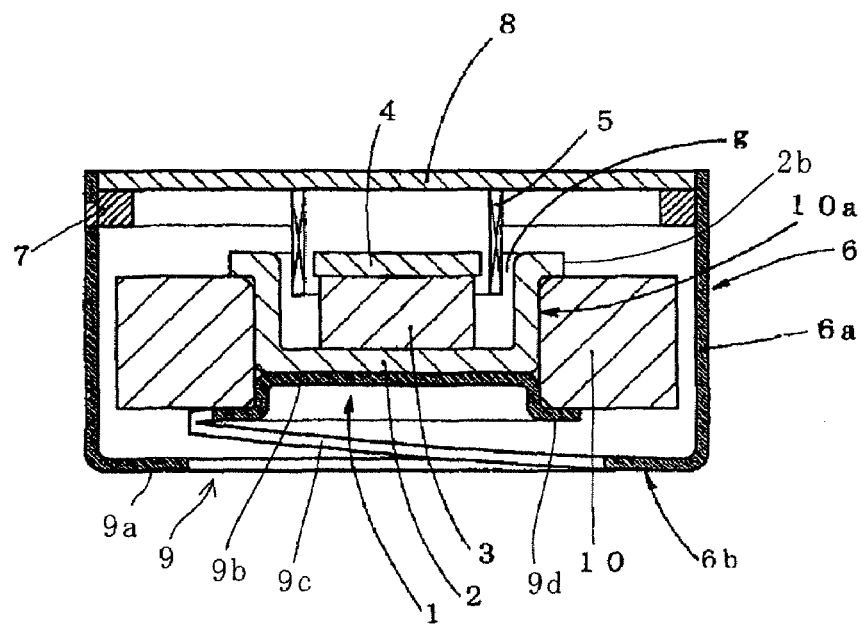
FIG. 1 is a sectional view of an electromagnetic exciter according to an embodiment of the present invention.
Figure 2:
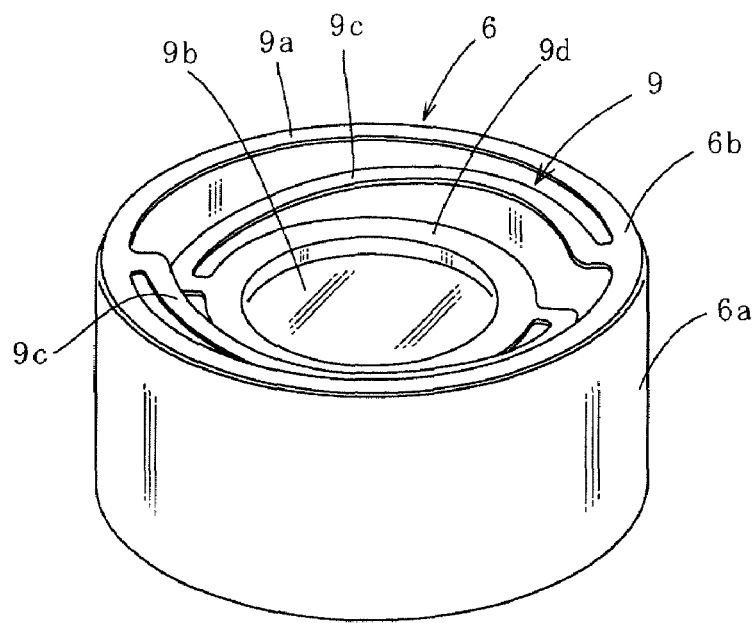
FIG. 2 is a perspective view of a casing of the electromagnetic exciter shown in FIG. 1.
Figure 3:
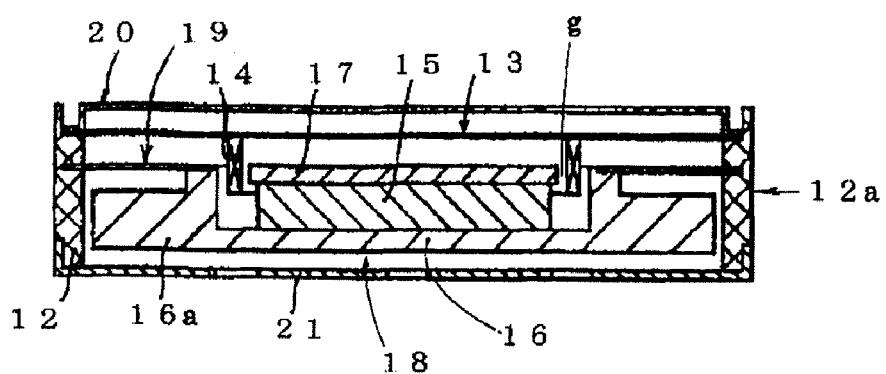
FIG. 3 is a sectional view of a conventional electromagnetic exciter.
Figure 4:
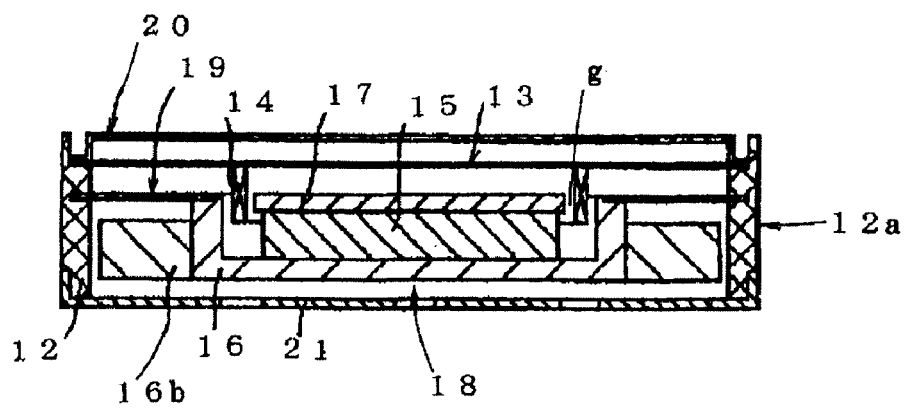
FIG. 4 is a sectional view of another conventional electromagnetic exciter.

FIG. 1 is a sectional view of an electromagnetic exciter according to an embodiment of the present invention. FIG. 2 is a perspective view of a casing of the electromagnetic exciter as seen from obliquely below. The electromagnetic exciter has a magnetic circuit assembly 1 including a substantially cup-shaped outer yoke 2. The magnetic circuit assembly further includes a circular columnar permanent magnet 3 and a flat plate-shaped inner yoke 4 that are successively stacked in the outer yoke 2. A magnetic gap g is formed between the outer yoke 2 and the inner yoke 4 so that a voice coil 5 is inserted into the magnetic gap g. The voice coil 5 is attached to a diaphragm 8 that is secured to a casing 6 through a brass ring 7 so as to close the upper end opening of the casing 6.

The casing 6 is formed by deep drawing a metal sheet in a press. The casing 6 has a cylindrical side wall 6a and a bottom 6b at the lower end of the side wall 6a. The bottom 6b is formed to serve as a suspension 9. More specifically, the suspension 9 includes a ring-shaped outer section 9a integrally formed along the bottom peripheral edge of the cylindrical side wall 6a. Further, as shown in FIG. 1, a disk-shaped inner section 9b is positioned above the outer section 9a and at the radial center of the casing 6 in concentric relation to the outer section 9a to support the magnetic circuit assembly 1. Connecting sections 9c interconnect the outer section 9a and the inner section 9b to support the inner section 9b so that it is vibratable in the axial direction of the casing 6. The connecting sections 9c are a pair of arcuate arms disposed in an annular space between the outer section 9a and the inner section 9b in symmetry to each other with respect to the axis of the casing 6. Each arcuate arm is connected at one end thereof to the outer section 9a and at the other end thereof to the inner section 9b. Each arcuate arm is gradually sloped from one end thereof, which is connected to the outer section 9a, to the other end thereof, which is connected to the inner section 9b, as illustrated in the figures.

In the illustrated example, the disk-shaped inner section 9b has an annular flange 9d along the peripheral edge thereof. An inner surface 10a an additional weight 10 is attached to the outer peripheral surface of the outer yoke 2 and clamped between the flange 9d and a flange 2b formed on the outer yoke 2.

In this electromagnetic exciter, the suspension is formed at the bottom of the casing integrally with the cylindrical side wall. Accordingly, the thickness of the cylindrical side wall of the casing can be reduced in comparison to the conventional art in which the suspension is secured to the cylindrical side wall of the casing with its radially outer end portion inserted into the cylindrical side wall of the casing by insert molding, and the diameter of the additional weight can be increased correspondingly to increase the mass of the magnetic circuit assembly. In addition, integral molding of the suspension with the casing allows a cost reduction. Thus, the simplified structure makes it possible to provide a low-cost and reliable electromagnetic exciter. Preferably, the casing having the cylindrical side wall and the suspension is made from metal.

It should be noted that the present invention is not necessarily limited to the foregoing embodiment but can be modified in a variety of ways without departing from the gist of the present invention.

What is claimed is:

1. An electromagnetic exciter comprising:
   a cylindrical casing having a first end opening and a second end opening;
   a diaphragm closing the first end opening of the cylindrical casing;
   a magnetic circuit assembly disposed inside the cylindrical casing for vibration in an axial direction of the cylindrical casing, the magnetic circuit assembly comprising a yoke, a permanent magnet disposed on the yoke, and a voice coil attached to the diaphragm, the magnetic circuit assembly cooperating with the voice coil to convert an electrical signal into an acoustic vibration, the magnetic circuit assembly configured to vibrate relative to the cylindrical casing; and
   a suspension formed in one piece of component including the cylindrical casing and comprising an outer ring portion integrally formed at the second end opening of the cylindrical casing, an inner portion inside the outer ring portion and at least one arcuate connection configured to elastically connect the outer ring portion and the inner portion, the inner portion being situated at an axial distance from the outer ring portion inside the cylindrical casing, and the inner portion elastically supporting the magnetic circuit assembly inside the cylindrical casing.

2. The electromagnetic exciter according to claim 1, wherein the outer ring portion is integrated throughout its periphery with the second end opening.

3. The electromagnetic exciter according to claim 2, wherein the inner portion is formed in a disk shape.

4. The electromagnetic exciter according to claim 3, wherein the at least one arcuate connection of the suspension comprises a pair of arcuate connections disposed diametrically opposite to each other inside the outer ring portion and symmetrically connecting the outer ring portion and the inner portion.

5. The electromagnetic exciter according to claim 1, wherein the cylindrical casing is made from metal.

6. The electromagnetic exciter according to claim 2, wherein the cylindrical casing is made from metal.

7. The electromagnetic exciter according to claim 4, wherein the cylindrical casing is made from metal.

8. The electromagnetic exciter according to claim 1, wherein the yoke is attached with a weight to make the magnetic circuit assembly sufficiently heavy to lower a natural frequency and reduce an amplitude that the magnetic assembly vibrates.

9. The electromagnetic exciter according to claim 1, wherein the permanent magnet is of a disk shape arranged along an axial direction.

10. The electromagnetic exciter according to claim 9, wherein the yoke comprises a cup-shaped outer yoke which receives the permanent magnet inside and an inner yoke attached to an upper surface of the permanent magnet such that the outer yoke and the inner yoke are positioned relative to each other to have a gap between them in which the voice coil is situated.

11. The electromagnetic exciter according to claim 1, wherein the suspension has a thickness substantially equal to that of the cylindrical casing.

* * * * *